United States Patent [19]
Yoshida et al.

[11] Patent Number: 5,943,823
[45] Date of Patent: Aug. 31, 1999

[54] LOWER SASH MADE OF SYNTHETIC RESIN FOR AUTOMOTIVE VEHICLE DOOR

[75] Inventors: Hiromitu Yoshida; Hiroshi Funada, both of Soja; Syusaku Heya, Anjo; Tomohiro Katayama, Toki-gun, all of Japan

[73] Assignees: OM Corporation, Okayama; Mitsubishi Jidosha Kogyo Kabushiki Kaisha, Tokyo, both of Japan

[21] Appl. No.: 09/018,825

[22] Filed: Feb. 4, 1998

[30] Foreign Application Priority Data

Feb. 6, 1997 [JP] Japan ................................ 9-023877
Jul. 15, 1997 [JP] Japan ................................ 9-190204

[51] Int. Cl.⁶ .................................................. E05D 13/00
[52] U.S. Cl. .............................................. 49/416; 49/414
[58] Field of Search ............................ 49/414, 415, 416, 49/428, 348, 349, 350, 351, 501, 404

[56] References Cited

U.S. PATENT DOCUMENTS

| 1,142,954 | 6/1915 | Gaskill .................................... 49/415 |
| 1,604,627 | 10/1926 | Bacher .................................... 49/416 |
| 2,132,104 | 10/1938 | Froeliger .................................. 49/415 |
| 2,534,687 | 12/1950 | Smith ...................................... 49/416 |
| 5,067,281 | 11/1991 | Dupuy . |
| 5,345,718 | 9/1994 | Dupuy . |
| 5,771,637 | 6/1998 | Oikawa et al. ....................... 49/414 X |

FOREIGN PATENT DOCUMENTS

385855  9/1990  European Pat. Off. ................. 49/441

*Primary Examiner*—Jerry Redman
*Attorney, Agent, or Firm*—Koda & Androlia

[57] ABSTRACT

A integrally formed synthetic resin lower sash for an automotive vehicle door structured so as to be disposed within a door panel and guide a window glass received within the door panel in a vertical direction. In order to reduce a frictional sound generated between a moving glass and the lower sash, the lower sash is constituted by an outer wing, an inner wing and a frame surrounding an edge portion of the window glass, a plurality of extending portions projecting toward the surface of the opposing window glasses and intermittently disposed to a direction of guiding the window glass are provided in the outer wing and the inner wing, and a projecting piece slidably in contact with each of inner and outer surfaces of the glass is extended in such a manner as to continue from the expanding portion, thereby forming a glass guide.

4 Claims, 7 Drawing Sheets

LOWER SASH MADE OF SYNTHETIC RESIN FOR AUTOMOTIVE VEHICLE DOOR

BACKGROUND OF THE INVENTION

1. Field of the Invention

The present invention relates to a lower sash for an automotive vehicle door disposed within a door panel of an automotive vehicle and guiding and holding a window glass when the window glass is received within the door panel.

2. Prior Art

The lower sash is structured such as to be disposed within the door panel of the automotive vehicle and to guide and hold the window glass (hereinafter, refer to a glass) received within the door panel so as to prevent an unstableness of the glass, and is normally provided in an upper sash corresponding to a window frame in a continuous manner. In recent years, the lower sash proceeds to a lower sash made of a resin in which a frame and a glass guide are integrally formed (for example, U.S. Pat. No. 5,345,718) from a lower sash in which a glass guide (a glass run) made of a rubber is mounted to a frame made of a plate metal (for example, U.S. Pat. No 5,067,281), so that a productivity can be improved with performing a lightening.

In a lower sash, in order to stably guide and hold the glass, (1) a suitable elasticity and (2) a suitable structural strength are required in a glass guide, and further (3) a reduction of a number of members and (4) a lightening of parts constituting an automotive vehicle should be taken into consideration. As to this point, the inventors have suggested in application Ser. No. 08/808,484 a lower sash made of a resin in which a glass guide, a wing close to an outer panel (hereinafter, refer to an outer wing) and a wing close to an inner panel (hereinafter, refer to an inner wing) can be integrally formed. The resin lower sash has a feature (5) capable of being formed by a simple metal mold, in addition to the features (1) to (4) described above.

The lower sash has been improved in the points (1) to (5) described above by being integrally formed and made of a resin, however, it is desired that a collision sound due to that an ascending and descending glass is collided with a glass guide of lower sash is reduced and that a mounting operability in manufacturing is improved. The collision sound is generated at a time when the descending lower sash collides with the glass guide, and can be reduced by designing a shape of the glass guide and a structural positional relation between the glass guide and each of the wings. Accordingly, it is required to grope for (6) a structure of the glass guide or each of the wings which can reduce the collision sound.

Further, most of the cases, the lower sash is mounted and fixed to the door panel by a bolt and a nut, so that the operability is better in the case that the mounting operation is performed in a state of applying the nut to the lower sash. Accordingly, it is normally structured such that the nut is held in the lower sash. Accordingly, the door panel mounting portion requires a holding structure that (7) the nut is simply held to the lower sash, (8) the holding state is maintained till being mounted and (9) the lower sash is not broken even in the case that the bolt is fastened in a slightly disorderly fashion.

SUMMARY OF THE INVENTION

Then, on the basis of the lower sash integrally formed and made of a resin which solves the points (1) to (5), in U.S. Ser. No. 08/808,404, a structure of the glass guide and a holding structure of a mounting nut in the door panel mounting portion have been mainly considered for the purpose of adding an improvement so as to solve the problems (6) to (9) and providing a lower sash having a more excellent effect with respect to a cost.

As a result of the consideration, at first there is developed in an improvement of a use feeling a lower sash made of a synthetic resin which is disposed within a door panel comprising an outer panel and an inner panel and guides and holds a glass received within the door panel, in which a glass guide is structured in such a manner as to be formed substantially in an inverted-C cross section in which an outer wing and an inner wing are stood on a frame in parallel and by extending a projecting piece from each of expanding portions formed in an opposing relation from a wing close to the outer panel and a wing close to the inner panel, an opening having an inner peripheral edge of a shape or a size including an outer peripheral edge of the glass guide is provided in the frame disposed at the same position as that of the glass guide so as to realize a rapping of the glass guide in which the opening is closed, and the frame, the outer wing, the inner wing and the glass guide are integrally formed.

In the lower sash, a plurality glass guides may dispose the expanding portion inclined to a descending direction of the glass in an inner surface of the wing in such a manner as to position in an opposing or an alternate relation.

The expanding portion serves as a reinforcing rib with respect to each of the wings, and can make the wing thin in order to increase a rigidity of each of the wings, thereby being useful for lightening. The projecting piece slidably contact with the glass does not have an elasticity, however, since the expanding portion is made a base portion, a rigidity necessary and sufficient for the glass guide can be secured. The glass guide constituted by the expanding portion and the projecting piece is in contact with both surfaces of the moving glass substantially at the same time in the case of being disposed in an opposing relation in both wings so as to prevent an unstableness of the glass, so that the collision sound can be reduced. Further, in the case that the glass guide is disposed in an alternate (zigzag) relation, the projecting piece of each of the glass guides is alternately collided to the descending glass so that the inner wall and the outer wall are independently twisted and deformed, and further as described above, since the inner wall and the outer wall are twisted in one united body due to a high rigidity, a spring constant and a mass of the projecting piece corresponding to a vibrating portion are set to be large. Accordingly, the invention is structured such as to reduce a frictional sound between the glass and the glass guide. The opening provided in the frame is used for a rapping forming the glass guide at a time of integrally molding the glass guide, each of the wings and the frame by a resin and serves to lighten the lower sash by reducing a material.

Since the collision sound is mainly generated at a time of housing the glass, it is preferable to constitute a glass guide having a continuous inclined side edge from the outer wing or the inner wing to the extending portion and the projecting piece in the surface parallel to the frame substantially in an opposing manner and in which a distance between the inclined side edges is gradually made narrow in the descending direction of the window glass. Accordingly, even in the case that the glass having a slight unstableness is descended, the glass is descended with being slidably contact with the inclined side edge and a track is gradually corrected to a center of the projecting piece opposing to each other, so that the collision sound can be reduced.

In addition, the present invention provides, in order to improve a mounting operability, a lower sash made of a synthetic resin which is disposed within a door panel comprising an outer panel and an inner panel and guides and holds a glass received within the door panel, in which in a door panel mounting portion for holding a nut with which a bolt for fixing the lower sash to the door panel is meshed, a holding hole receiving a peripheral edge of a seat surface of the nut and loosely fitting the nut, and a coming-out preventing projection hooked to the seat surface and the peripheral edge of the seat surface of the nut fitted into the holding hole are integrally formed.

The lower sash described above is structured such that the nut is previously held in the lower sash so as to improve the mounting operability. Since the holding hole receiving the peripheral edge of the seat surface of the nut is loosely fitted into the nut, the door panel mounting portion is avoided from breaking due to the load applied through the nut at a time of fastening the bolt. The coming-out preventing projection is provided for the purpose that the nut fitted into the holding hole does not come out from the holding hold, and is structured such as to hook the seat surface so as to press the nut to the holding hole and to hook in the peripheral edge of the seat surface so as to prevent the unstableness of the nut against the holding hole. In order to prevent the unstableness, it is preferable that a plurality of coming-out projections are provided in a symmetrical manner around an axis of the center of the holding hole, and by making a part or all of the plurality of coming-out projections a projection having a freedom with a stability (hereinafter, refer to a free projection), the nut can be fitted into the holding hole over the projection and the free projection is in contact with the peripheral edge of the seat surface of the nut in a pressing manner so as to press the nut to the other projection, so that the unstableness of the nut can be better prevented. As a projection having a freedom with a stability, there is a projection having a plate spring structure of a U-shaped cross section extending from the peripheral portion of the holding hole.

DETAILED DESCRIPTION OF THE PREFERRED EMBODIMENTS

Figure 1:
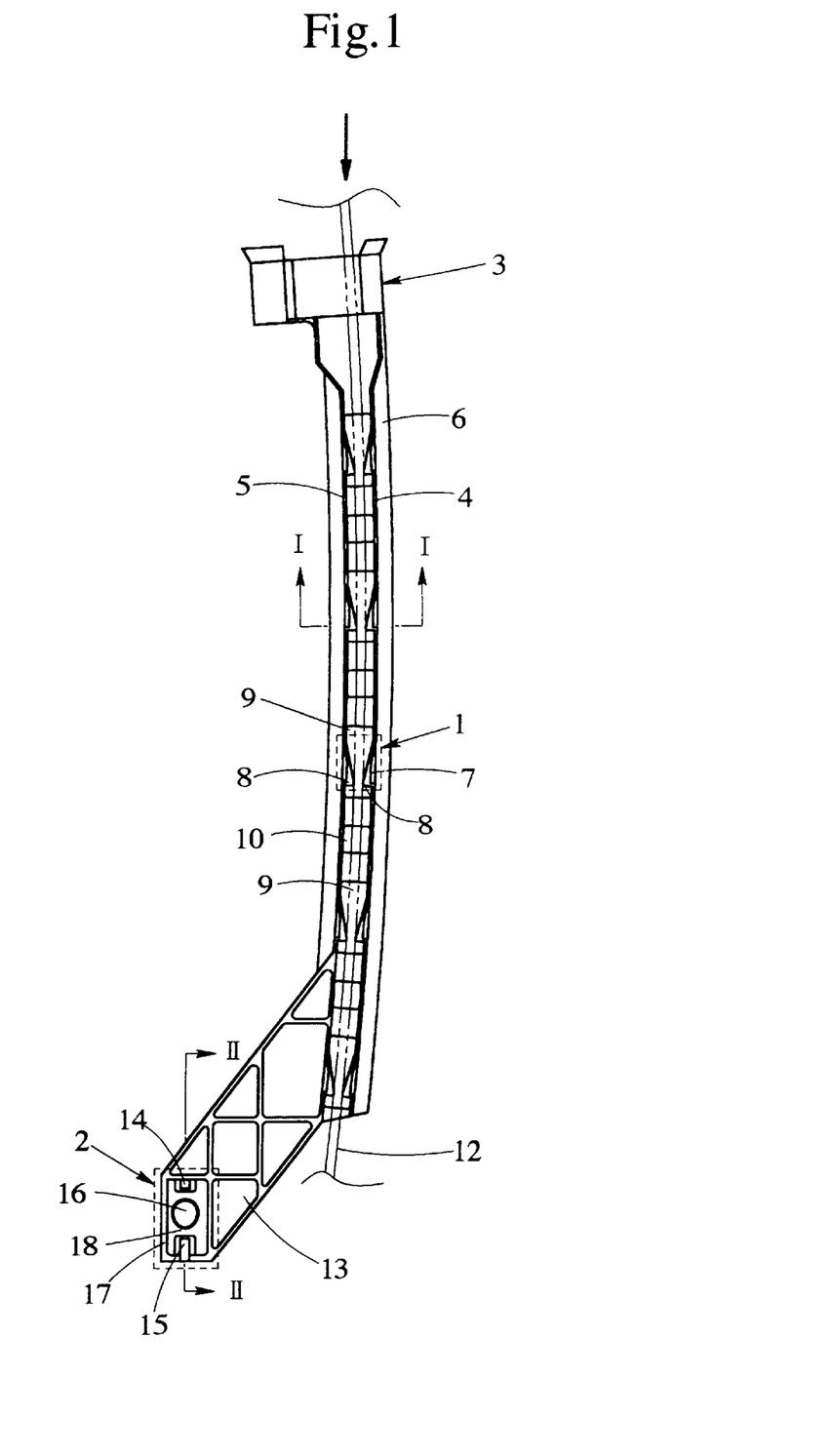
FIG. 1 is a front elevational view which shows a lower sash made of a resin in accordance with the invention.

An embodiment in accordance with the invention which improves an effect with respect to a cost of a lower sash made of a resin and integrally formed will be described below with reference to the attached drawings. FIG. 1 is a front elevational view of a resin lower sash constituting a glass guide 1 and a door panel mounting portion 2 in accordance with the invention, the lower sash is integrally molded by a resin till a door panel fitting portion 3 disposed above.

Accordingly, the lower sash in accordance with this embodiment is integrally molded by a resin in such a manner as to include not only an outer wing 4, an inner wing 5 and a frame 6, but also the glass guide 1 constituted by an expanding portion 7 provided in each of the wings 4 and 5 and a projecting piece 8, the door panel mounting portion 2 extending from the inner wing 5 and the door panel fitting portion 3 provided at the upper ends of both the wings 4 and 5. At this time, in order to realize a rapping forming the expanding portion 7 and the projecting piece 8 (refer to FIG. 2) opposing along the upper edge of each of the wings 4 and 5, as shown in FIG. 1, it is understood that an opening 9 provided in the frame 6 and the glass guide 1 in both the wings 4 and 5 are disposed at the same position. In other words, the each openings 9 along to the frame 6 is situated in the same position of each glass guides 1, and the openings shape and size is somewhat larger than outline of each glass guides 1. Therefore, it is able to integral molding with the frame 6, the outer wing 4 and the inner wing 5 being ejected from the molding dies. In the lower sash in accordance with this embodiment, in order to lighten the frame 6, a middle port 10 is further provided in such a manner as to be alternate with the opening 9.

Figure 2:
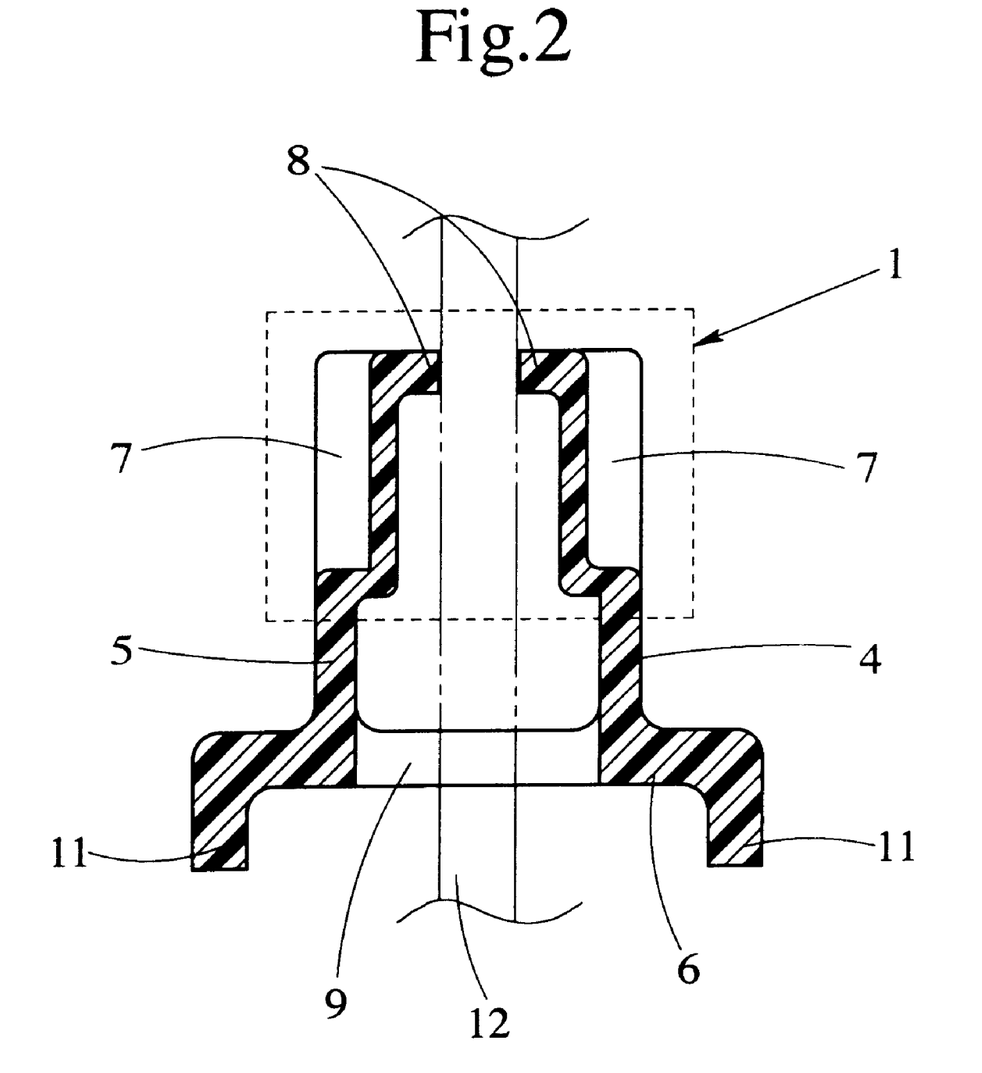
FIG. 2 is a cross sectional view along a line 1—I in FIG. 1 which shows a cross sectional shape of a glass guide.

Each of the outer wing 4 and the inner wing 5 is, as shown in FIGS. 1 and 2, a wall surface standing on the frame 6 having ribs 11 and 11 to a back surface direction formed on both side edges in a parallel manner, and the glass guide 1 is constituted by the expanding portion 7 and the projecting piece 8 provided in both the wings 4 and 5 in an opposing relation. The expanding portion 7 is, as shown in FIG. 2, a projecting and deforming portion provided in such a manner as to oppose from a middle portion of each of the wings 4 and 5 to the upper edge, and serves as a base portion for the projecting piece 8, and the projecting piece 8 is extended along the upper edge of the expanding portion 7. As described above, a cross sectional shape from the frame 6 to each of the wings 4 and 5 and the glass guide 1 is made a complex step shape, and the shape improves a rigidity of each of the wings 4 and 5, thereby realizing the outer wing 4 and the inner wing 5 having a thickness smaller than that of the conventional one.

Further, the glass guide 1 forms a inclined side edge in which the expanding portion 7 and the projecting portion 8 gradually make an interval narrow to a descending direction of a glass 12 (a direction of an arrow in FIG. 1) in the surface parallel to the frame 6, in such a manner as to continue from each of the wings 4 and 5, and a sudden collision between the glass guide 1 and the glass 12 is avoided by being slidably in contact the inclined side edge with the descending glass 12, thereby preventing a collision sound. Still further, the expanding portion 7 and the projecting portion 8 having the shape described above prevents an unstableness of the glass 12 descending with gradually correcting a track of the glass 12 slidably contact with the inclined side edge to a middle of the projecting pieces 8 and 8 opposing to each other, and further, since the opposing projecting pieces 8 and 8 are slidably in contact with the glass 12 substantially at the same time, the glass 12 can be stably guided. In accordance with this embodiment, the structure is made such that the glass 12 is slidably in contact with the projecting piece 8 from the inclined side edge in a continuous manner by making a shape of a peripheral edge of the projecting piece 8 a smooth circular arc, and further, a frictional force due to an excess slidable contact is reduced by making the projecting piece 8 in contact with the glass 12 at a point.

Figure 3:
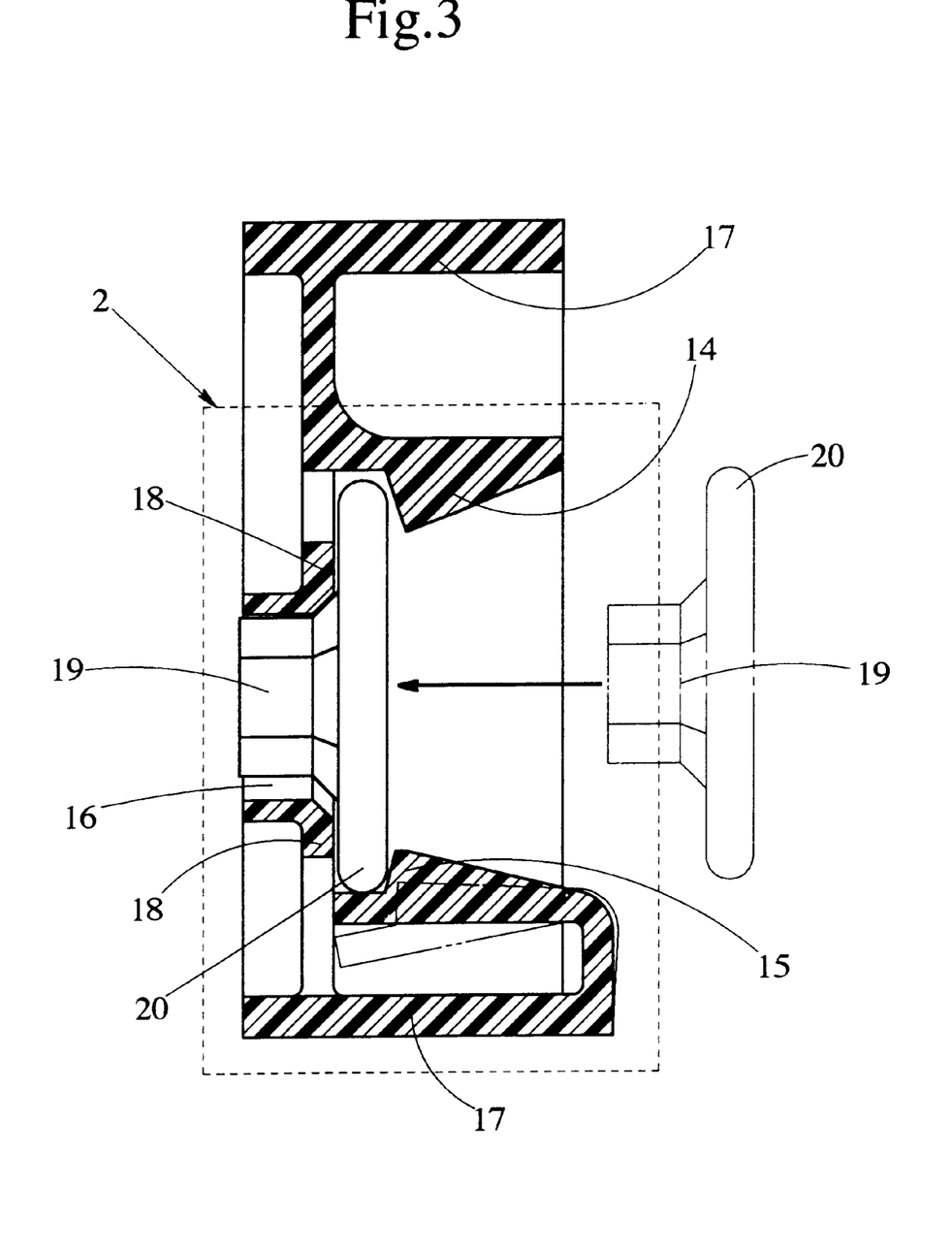
FIG. 3 is a cross sectional view along a line II—II in FIG. 1 which shows a cross sectional shape of a mounting portion for a door panel.

The door panel mounting portion 2 in the glass guide 1 is formed in a lower end of a lattice frame 13 extending diagonally to a downward direction from an adjacent portion to a lower end of the inner wing 5 as shown in FIG. 1, and as a coming-out preventing projection, a holding hole 16 having a fixed projection 14 disposed above in FIG. 1 and a free projection 15 disposed downward is formed. The details thereof is, as shown in FIG. 3, on the contrary that the fixed projection 14 is directly formed in a peripheral wall surface 17 surrounding the holding hole 16, the free projection 15 has a plate spring construction having a U-shaped cross section by folding back from the wall surface 17 so as to give a flexibility and the projection forming portion is separated from the wall surface 17. A seat surface receiving portion 18 is provided in a peripheral edge of the holding hole 16, so that a seat surface 20 of a nut 19 is pressed to the seat surface receiving portion 18 by the fixed projection 14 and the free projection 15, thereby being held in the holding hole 16 in a state of being held between the fixed projection 14 and the free projection 15.

The nut 19 is fitted into the holding hole 16 by deforming the free projection 15 toward the wall surface 17 and temporarily expanding the interval between the fixed projection 14 and the free projection 15. The free projection 15 having a spring shape is restored to the original state after the seat surface 20 passes, so as to press the seat surface 20 together with the fixed projection 14 toward the seat surface receiving portion 18. The holding hole 16 has an oval shape extending slightly downward, as is apparent from FIGS. 1 and 3, and the fitted nut 19 is in a loose fit state. Since the free projection 15 presses the nut 19 toward the fixed projection 14 in an elastic state, a load applied to the nut 19 at a time of screwing can be received by the fixed projection 14, so that the fixed projection 14 and the free projection 15 is avoided from being broken.

Figure 4:
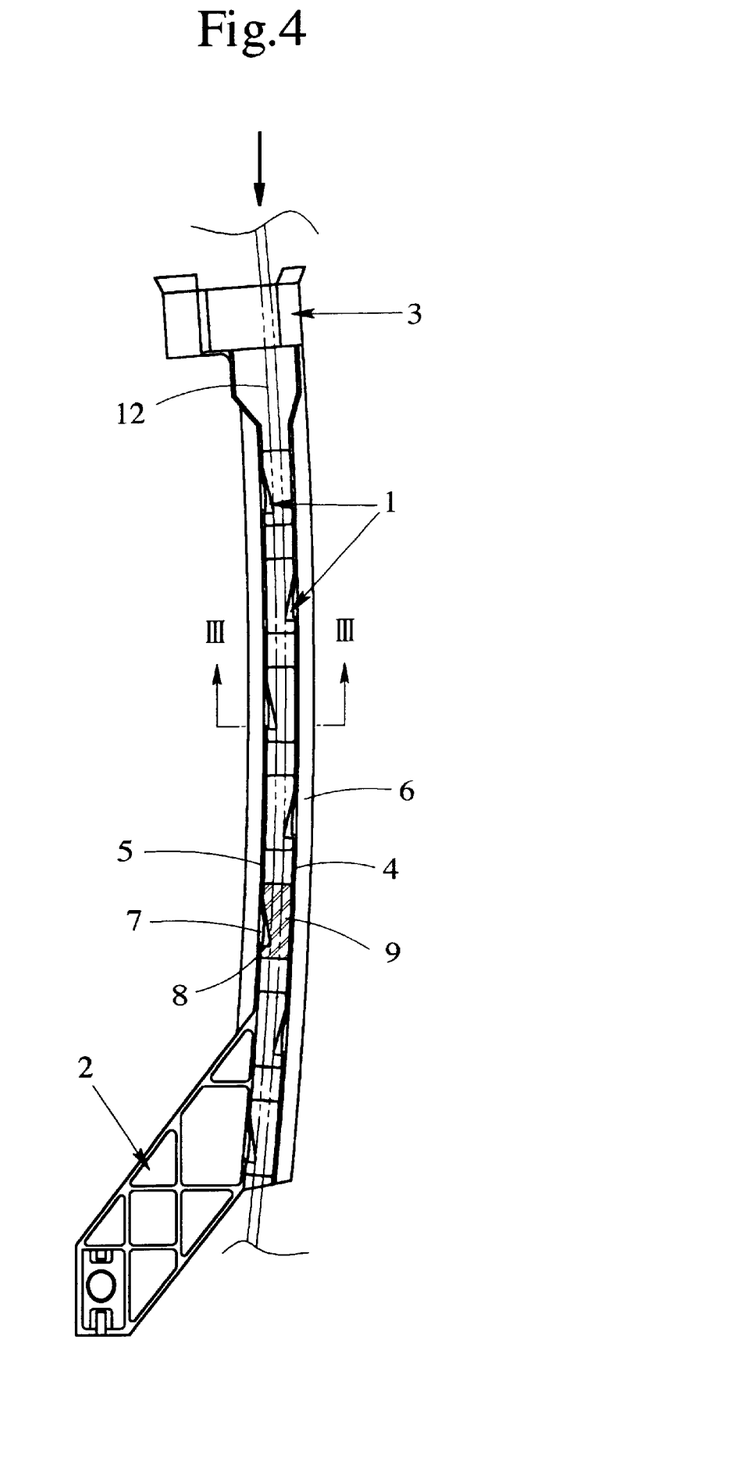
FIG. 4 is a front elevational view which shows a lower sash made of a resin in accordance with another embodiment.
Figure 5:
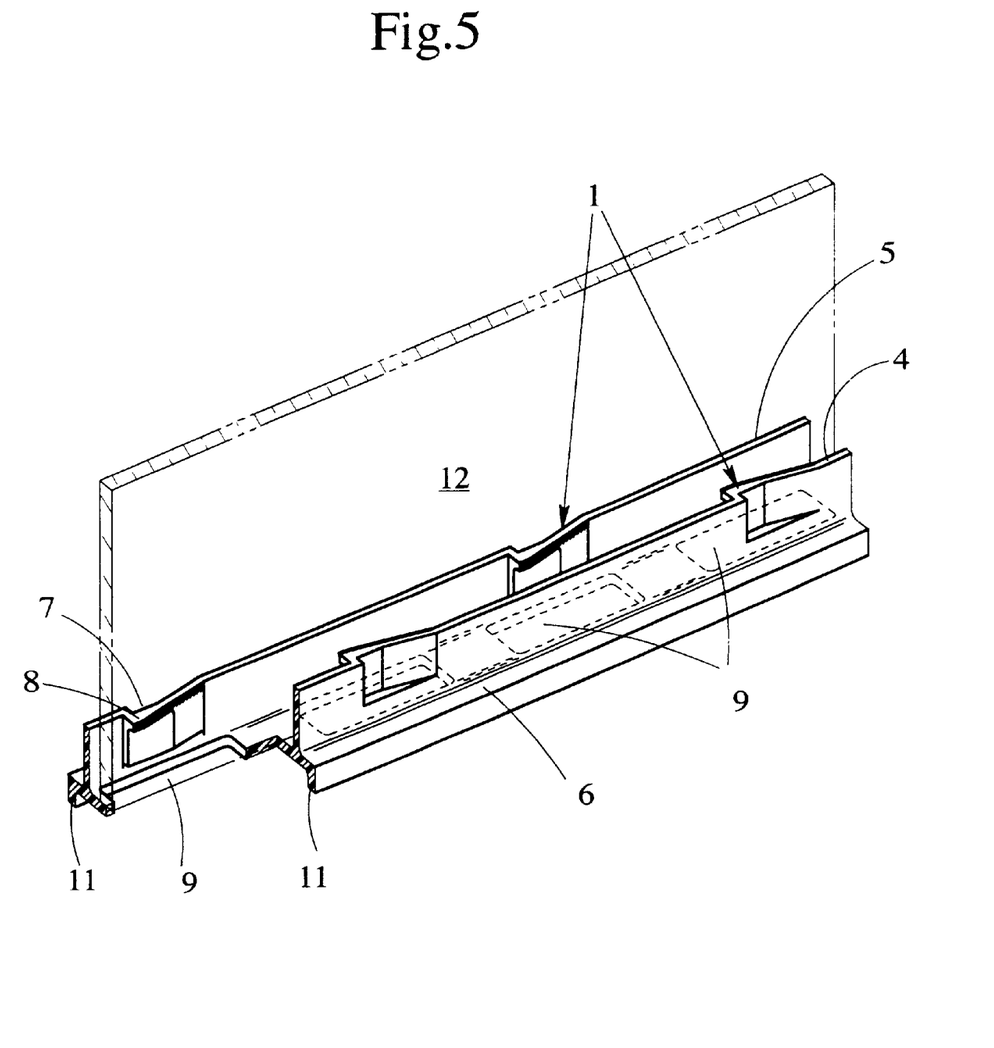
FIG. 5 is a partly broken schematic view which shows a middle portion of the lower sash in an extracting manner.
Figure 6:
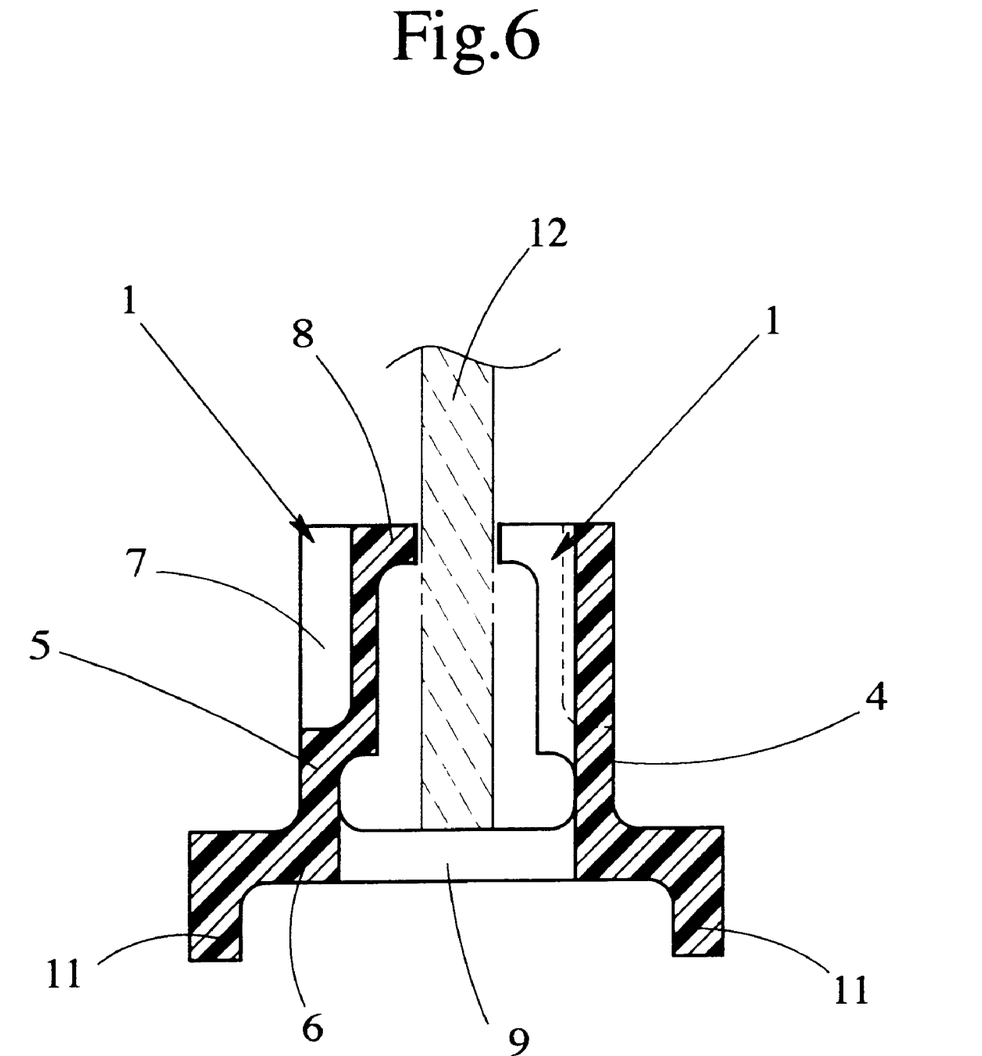
FIG. 6 is a cross sectional view along a line III—III in FIG. 4 which shows a cross sectional shape of a glass guide.

FIG. 4 shows another embodiment of a resin lower sash in accordance with the invention, as is apparent from a comparison with FIG. 1, the lower sash has a feature that the glass guide 1 is alternately disposed in a zigzag manner with respect to the outer wing 4 and the inner wing 5. In this case, as in the same manner as that of the preceding embodiment shown in FIG. 1, the frame member in the glass guide 1, the door panel mounting portion 2 disposed below the same and the door panel fitting portion 3 disposed above the same are constituted by an integral synthetic resin forming product. The integral forming can be achieved by that a rapping can be performed by a shape of the frame 6 positioned in the expanding portion 7 and the projecting portion 8 of the glass guide 1 formed in a zigzag manner and the opening 9 of the frame 6 at that portion. The relative relation between these members will be apparently understood from a schematic view shown in FIG. 5, a cross sectional view along a line III—III in FIG. 1 shown in FIG. 6 and an enlarged front elevational view of the glass guide 1 shown in FIG. 7.

Figure 7:
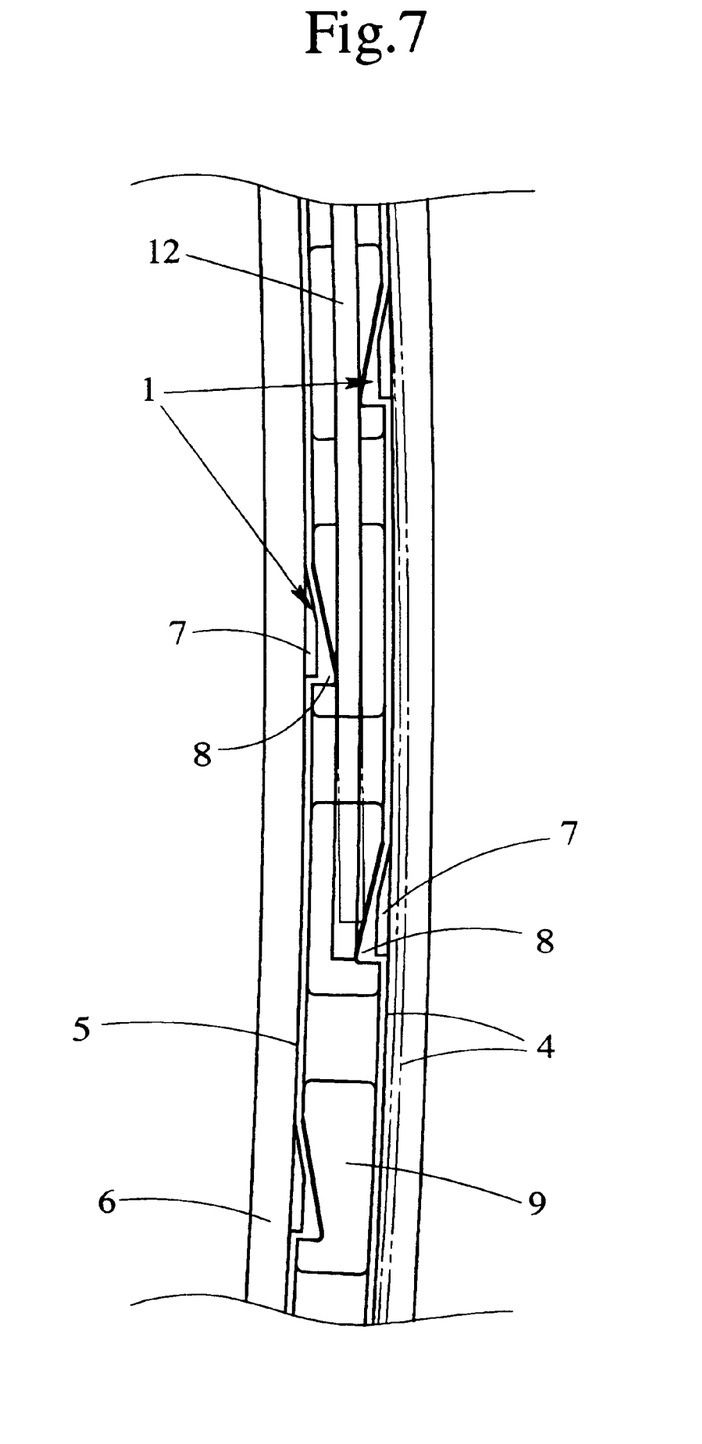
FIG. 7 is a partly enlarged front elevational view of the lower sash which shows a deformation of an outer wall at a time of correcting a track of a descending class.

The rigidity of the outer wing 4 and the inner wing 5 is improved since the expanding portion 7 serves as a reinforcing rib, however, since the glass guide 1 is formed in a zigzag manner, as shown in FIG. 7, the descending glass 12 is alternately collided with the projecting piece 8 in each of the glass guides 1 so that each of the wings is independently twisted and deformed, thereby substantially decreasing a surface pressure in each of the projecting pieces 8. Further, since each of the wings vibrates integrally together with the projecting piece 8, a spring constant and a mass of the projecting piece 8 corresponding to a vibrating portion are set to be an increased value. Accordingly, the lower sash in accordance with this embodiment can reduce the frictional sound between the glass 12 and the glass guide Further, since the glass guide 1 continues from the outer wing 4 and the inner wing 5 to the expanding portion 7 and the projecting piece 8 in the surface parallel to the frame 6, forms a side surface (refer to a thick line in FIG. 7) of the expanding portion 7 inclined toward the descending direction of the glass 12, and corrects the track with making the descending glass 12 in slidably contact with each of the slidably contact surface, a sudden collision between the glass guide 1 and the glass 12 can be avoided, thereby preventing the collision sound. A function of correcting the track of the glass 12 by the expanding portion 7 can prevent the unstableness of the descending glass 12 and can realize a stable guide of the glass 12.

Particularly, a use feeling at a time of an actual movement of the glass is improved since the frictional sound between the moving glass and the glass guide in a state that a foreign particle enters therein is reduced, so that a product having a higher-class feeling can be provided.

In accordance with the invention, an effect of the integrally formed resin lower sash with respect to a cost can be more improved. Accordingly, in one view, the collision sound at a time of receiving the glass is reduced by improving the structure of the glass guide, and the other view, an improvement in the mounting operability is realized by remodeling the door panel mounting portion held by the nut. Since in the resin lower sash in accordance with the invention, the improvement and the remodeling described above can be manufactured or processed at one time by the integral molding, an additional time and labor in the manufacturing process are not required. A point of improving an effect with respect to a cost by producing an additional effect at a time of an actual use from the manufacturing process is rather excellent.

What is claimed is:

1. A lower sash made of a synthetic resin for an automotive vehicle door which is disposed within a door panel and guides and holds a window glass received within the door panel in a vertical direction, said lower sash comprising an outer wing an inner wing, and a frame surrounding an edge portion of said window glass and a glass guide, said glass guide comprising a plurality of expanding portions projecting toward a surface of opposing window glasses and intermittently disposed to a direction of guiding the window glass provided in said outer wing and said inner wing, and a projecting piece slidably in contact with each of inner and outer surfaces of the window glass extending continuously from each of said expanding portions and wherein the expanding portions of each of the glass guides has a slidable contact edge inclined toward a descending direction of the window glass the frame provided with the glass guide, a door panel fitting portion disposed above the glass guide and a door panel mounting portion disposed below the glass guide or an integral molded product, and the door panel mounting portion disposed below the frame provided with the glass guide comprises a holding hole receiving a peripheral edge of a seat surface of a nut with which a mounting bolt is meshed and loosely fitting with said nut, and a coming-out preventing projection hooked with the seat surface and a peripheral edge of the seat surface of the nut fitted to said holding hole.

2. A lower sash made of a synthetic resin for an automotive vehicle door according to claim 1, wherein respective expanding portions of the glass guides provided in the outer wing and the inner wing of the frame are respectively disposed to oppose to each other.

3. A lower sash made of a synthetic resin for an automotive vehicle door according to claim 1, wherein respective expanding portions of the glass guides provided in the outer wing and the inner wing of the frame are respectively disposed in an alternate positional relation.

4. A lower sash made of a synthetic resin for an automotive vehicle door according to claim 1, wherein openings are provided in said frame in a same position as each of said glass guides and each of said openings is larger in size than each of said glass guides and said glass guides, said outer wing and said inner wing are integrally injection molded from molding dies.

\* \* \* \* \*